W. G. FORDING.
BLOW VALVE AND OPERATING MEANS FOR GAS WELLS.
APPLICATION FILED MAY 6, 1914.
1,182,083.
Patented May 9, 1916.
2 SHEETS—SHEET 1.
Fig. 1.
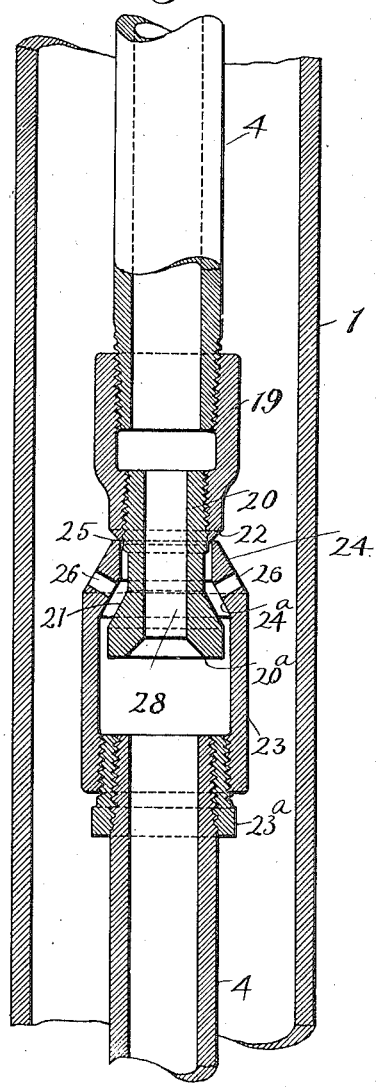
Fig. 2.
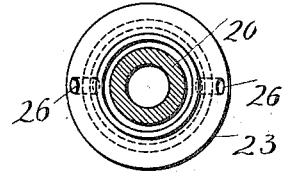
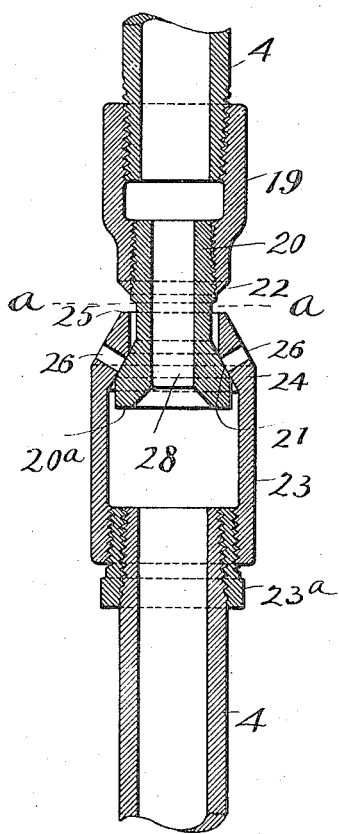
Fig. 3.
Witnesses
E. B. Gilchrist
L. I. Porter
Inventor
William G. Fording
by Thurston & Kwis
Attys.

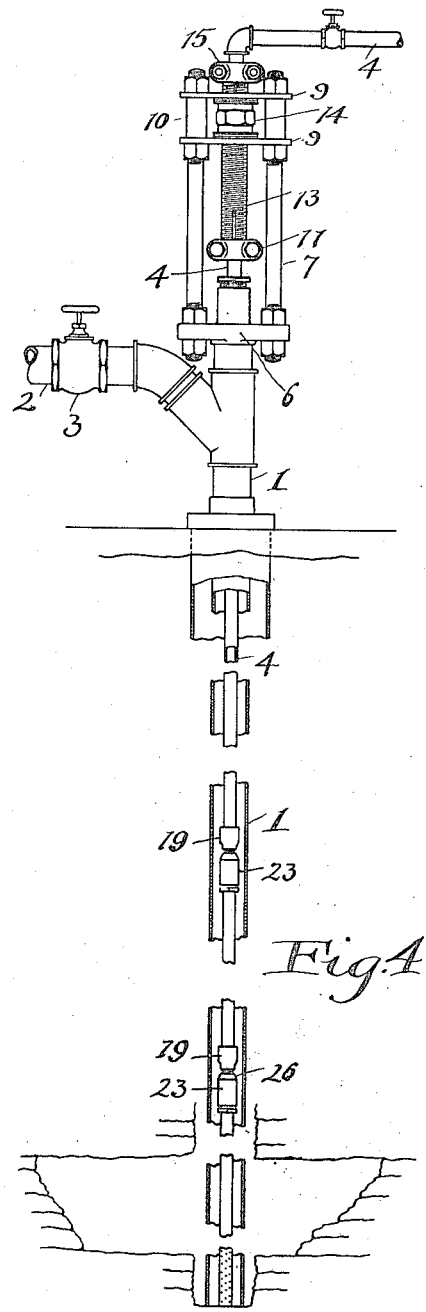
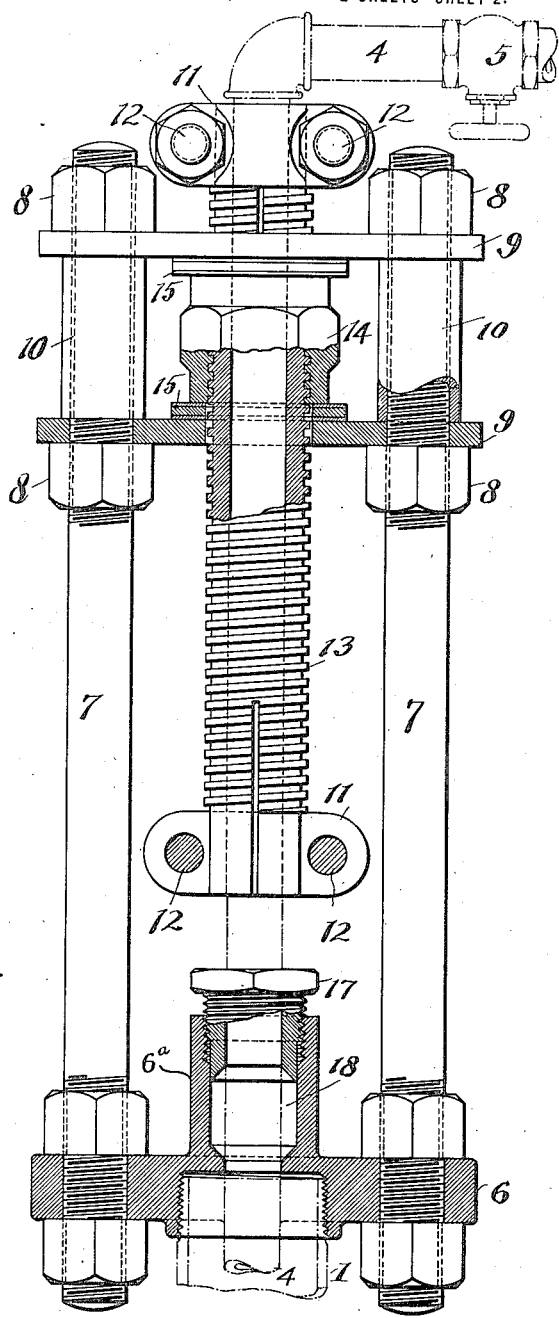

UNITED STATES PATENT OFFICE.

WILLIAM G. FORDING, OF CLEVELAND, OHIO.

BLOW-VALVE AND OPERATING MEANS FOR GAS-WELLS.

1,182,083. Specification of Letters Patent. Patented May 9, 1916.

Application filed May 6, 1914. Serial No. 836,619.

*To all whom it may concern:*

Be it known that I, WILLIAM G. FORDING, a citizen of the United States, residing at Cleveland, in the county of Cuyahoga and State of Ohio, have invented a certain new and useful Improvement in Blow-Valves and Operating Means for Gas-Wells, of which the following is a full, clear, and exact description.

This invention relates to blow valves for gas wells, such as are employed for the purpose of blowing out of the well collected liquids which tend to obstruct the flow of gas in said well.

Blow valves of various kinds have heretofore been used or proposed, but it is found that they have defects chief of which is that they are liable to stick, because of the corrosive action of the liquid found in such wells, such liquid being usually of such a nature as to cause corrosion of metal parts immersed therein.

One of the objects of the present invention is to provide a simple and efficient valve having a minimum of finished surfaces, such as would if corroded be liable to cause sticking of the valve, a liberal clearance for corrosion being provided between the movable parts of the valve.

A further object is to provide a series of such valves placed at intervals in the liquid pipe line and so arranged that they may be effectively opened or closed in succession.

A still further object is to provide improved means for raising and lowering the liquid pipe line.

In the construction embodying my invention, the liquid pipe line is provided with a number of movable pipe sections which are connected by valves, each of which is held open by gravity or by the weight of the liquid pipe line above it, and when the liquid line is raised, the uppermost valve will yield and close first, and so on down to the lowermost valve, with the result that the liquid is first blown out by gas pressure through the topmost valve, and after the liquid above said valve is blown out by the gas pressure, the liquid pipe line or that part above the uppermost valve is raised, so as to close said valve. Whereupon, the liquid above the valve below the uppermost is blown out, etc., down to the lowermost valve.

My invention may be further briefly summarized as consisting in certain novel details of construction and combinations and arrangements of parts which will be described in the specification and set forth in the appended claims.

In the accompanying sheet of drawings wherein I have shown the preferred embodiment of my invention, Figure 1 is a longitudinal section of one of the blow valves in its open position, and of the well casing around the same; Fig. 2 is a horizontal section on the line *a—a* of Fig. 3; Fig. 3 is a longitudinal sectional view of the blow valve in its closed position; Fig. 4 is a sectional view of the well provided with my invention; and Fig. 5 is a detail partly in section of the hoisting and lowering devices at the top of the liquid pipe line.

In the drawings, the gas well casing is indicated at 1, and from this casing, there is led off a gas main 2 having a valve 3. The liquid pipe line 4 with which my invention is directly involved, is provided at its upper end with a valve 5 to control the flow of liquid therethrough. This liquid pipe line is composed of a number of relatively movable sections connected or coupled together by valves constructed in accordance with my invention, the valves being arranged at intervals in the length of the liquid pipe line. The different sections of the liquid pipe line are adapted to be successively raised or lowered to close and open the valves by raising and lowering mechanism which is shown in Fig. 5. By reference to this figure, it will be seen that a cap 6 is attached to the top of the well casing 1. This cap 6 is connected by parallel rods 7 to a pair of plates 9 which are spaced apart by spacing collars 10. Clamped to the liquid pipe line by clamps 11 and clamping bolts 12 is a threaded sleeve 13 provided at each end with slots by which it can be effectively clamped to the liquid pipe line. The sleeve 13 and the liquid pipe line are adapted to be raised and lowered by a suitable nut 14 which is located between the plates 9 and engages the threaded sleeve 13, thrust collars 15 separating the nut from the two plates 9. By turning the nut 14 in one direction, in consequence the liquid pipe line 4 is raised, and by turning the nut in the reverse direction, the sleeve and pipe line are lowered. By means of a gland 17 adapted to contain packing in the chamber 18, said gland being provided in a tubular extension 6ª of seat 6, leakage is prevented when the pipe line is raised or lowered.

One of the main features of my invention resides in the blow valve itself which connects each pair of the relatively movable sections of the liquid pipe line 4. The number of these pipe sections and number of blow valves can be varied to suit the requirements of any particular case, the number usually depending upon local conditions, i e., the conditions of the locality in which the well is located. By reference to Figs. 1, 2 and 3, it will be observed that the lower end of each pipe section is united by a reducing coupling 19 to an inner tubular valve member 20 having a reduced middle portion, and externally tapered or conical lower end portion 20ª, the latter having a finished outer tapered or conical surface 21, and the lower end of the coupling 19 having a tapered or conical finished surface 22. The surfaces 21 and 22 on the overhanging or shouldered parts constitute in effect seats which are engaged by the other coöperating part of the valve.

A valve casing 23 coöperates with the parts just described to form the valve and the coupling or connection between two adjacent pipe line sections. This casing 23 at its lower end is connected by a reducing sleeve 23ª to the upper end of the section, and at its upper end is provided with a conical portion 24 which incloses the lower end of the valve member 20 and is provided with a finished inner tapered or conical surface 24ª cut on the same taper as the surface 21 of the valve member 20, and adapted to engage the latter. At its upper end, this casing has a finished surface 25 which is adapted to engage the finished surface 22 of the reducing sleeve 19. The upper tapered end 24 of the valve casing is provided also with vents or port openings 26 which are closed when the valve member 20 is elevated a distance such that the tapered surface thereof engages the tapered surface 24ª of the casing member 23, but are opened when the valve member is lowered, communication then being established between these ports and the inner passageway 28 through the tubular valve member 20, so that liquid can flow from the casing 1, through the ports into the valve casing, and thence upwardly through the valve member and through the upper section of the liquid pipe line 4. It will be observed that the relatively movable parts of the valve have ample clearance so that sticking of the valve due to corrosion or accretion is practically impossible. In consequence, not only will the valve operate at the time when its operation is desired or necessary, but it has a very long life. Furthermore, the weight of the parts of the liquid pipe line insures a tight bearing between the surface 21 and 24ª. Additionally, the construction is very simple and reliable in action.

Let it be assumed that a well which yields gas is equipped with a liquid pipe line having the required number of movable pipe sections which are connected by valves, such as the one above described. Ordinarily all the valves in the liquid pipe line will be open, said line being then at its lowered position. If now, the valve 3 in the gas main 2 is closed, so that the gas pressure in the well may build up, and if the valve 5 in the liquid pipe line is opened and gas flows through the valve 5, it is apparent that the uppermost valve or valves of the liquid pipe line are not immersed in the liquid. If this occurs, by turning the nut 14 on the threaded sleeve 13, the liquid pipe line is raised sufficiently to successively close the uppermost valve or valves until all the valves above the liquid in the well are closed. Then the gas pressure forces the liquid through the ports or openings 26 of the uppermost open valve which is below the level of the liquid, and forces the liquid up through the pipe line and out of the well. After the liquid above said open valve is forced from the well, the pipe line will be raised still further, closing the next open valve below, when the liquid above this valve will be forced from the well. This will be continued until all the valves are successively closed from the uppermost to the lowermost, with the result that all the liquid in the well will be removed. Afterward, the liquid pipe line can be lowered so as to open all the valves to normal open position, the latter operation permitting the accumulating liquid to seek its level in the liquid pipe line, as well as in the well casing.

Having thus described my invention, what I claim is:

1. In combination in a gas well, a liquid pipe line provided with relatively movable sections, a valve connecting adjacent sections, the upper section of any two adjacent sections having at its lower end a tubular valve member provided at its lower end with an externally tapered part, a valve casing at the top of the other section and provided with a conical upper end which incloses and is adapted to engage said tapered part of the valve member, the two parts of the valve being out of engagement with each other when being moved relatively.

2. In combination in a gas well, a well casing, a liquid pipe line extending therethrough and having a plurality of relatively movable sections, each pair of sections being connected by a valve comprising a tubular valve member projecting downwardly from the lower end of the upper section of the pair, and provided with upper and lower spaced shoulders constituting seats, a valve casing having a reduced upper end inclosing the lower part of the valve member and having one portion adapted to engage the upper seat when the valve is opened, and another portion adapted to engage the lower seat when the valve is closed, said reduced portion of the casing having port openings adapted to be closed by said lower seat.

3. In combination in a gas well, a liquid pipe line having a plurality of relatively movable sections, each pair of sections being connected by a valve comprising a valve member at the lower end of the upper section of the pair, and provided with two spaced seats, one above the other, the lower end of the valve member being externally tapered and forming one of said seats, a valve casing at the upper end of the lower section of the pair and provided at its upper end with a tapered portion having valve openings and adapted to engage the lower seat so as to cause the closure of said openings, and the upper end of the casing being adapted to engage the upper seat whereby said valve is opened.

4. In a valve structure for the liquid pipe line of a gas well, a pair of pipe sections, a reducing sleeve secured to the end of one of said sections, a tubular valve member secured in said sleeve, said valve member having at its end a flaring or externally tapered portion constituting a seat and the adjacent end of the reducing sleeve having a seat spaced from the seat of the valve member, the other pipe section having a valve casing secured thereto and inclosing the flaring part of the valve member, the end of the casing being tapered and having an inner tapered surface adapted to engage the tapered surface of the valve member, and said tapered part of the casing having port openings which are closed when the tapered surfaces are in engagement.

5. In combination with the casing of a well, a cap at the upper end of the casing, a pipe line extending through said casing and cap, a threaded sleeve secured to said pipe line above the cap, a nut engaging said sleeve for raising and lowering the sleeve and pipe line, and means secured to said cap for positioning the nut.

6. In combination with the casing of a well, a pipe line extending therethrough, a cap secured to the top of the casing and projecting laterally therefrom, a threaded member on the pipe line above the cap, a pair of upright supports secured to the laterally projecting part of the cap, a pair of vertically displaced spaced members mounted on said upright supports, and a nut between said members and engaging said threaded member.

7. In combination with the casing of a well, a pipe line extending through the casing and upwardly above the same, means for raising and lowering the pipe line comprising a threaded sleeve secured to the casing, a nut engaging said sleeve, a pair of upright members on opposite sides of the sleeve, and a pair of plates supported by said upright members, one vertically above the other on opposite sides of the nut, and constituting a retaining means for the nut to prevent vertical displacement thereof.

8. In combination in a gas well, a liquid pipe line provided with relatively movable vertically alined sections, a valve connecting adjacent sections, and comprising coöperating members capable of predetermined relative vertical movement, said members having seating portions which engage at the upper and lower limits of movement and being out of engagement while one member is being moved relative to the other between said limits of movement.

9. In combination in a gas well, a liquid pipe line provided with relatively movable sections, a valve-coupling connecting adjacent sections, and comprising coöperating valve members, one receiving a portion of the other, and one having a pair of longitudinally displaced seats adapted to be engaged by the other and between said seats having a reduced portion normally out of engagement with the part of the other member which moves between said seats.

In testimony whereof, I hereunto affix my signature in the presence of two witnesses.

WILLIAM G. FORDING.

Witnesses:
 A. F. KWIS,
 L. I. PORTER.